United States Patent
Khan et al.

(10) Patent No.: US 11,366,988 B2
(45) Date of Patent: Jun. 21, 2022

(54) METHOD AND SYSTEM FOR DYNAMICALLY ANNOTATING AND VALIDATING ANNOTATED DATA

(71) Applicant: Wipro Limited, Bangalore (IN)

(72) Inventors: Ghulam Mohiuddin Khan, Bangalore (IN); Deepanker Singh, Meerut (IN); Sethuraman Ulaganathan, Tiruchirappalli (IN)

(73) Assignee: Wipro Limited, Bangalore (IN)

( * ) Notice: Subject to any disclaimer, the term of this patent is extended or adjusted under 35 U.S.C. 154(b) by 423 days.

(21) Appl. No.: 16/508,590

(22) Filed: Jul. 11, 2019

(65) Prior Publication Data

US 2020/0380312 A1 Dec. 3, 2020

(30) Foreign Application Priority Data

May 28, 2019 (IN) .............................. 201941021151

(51) Int. Cl.
*G06K 9/62* (2022.01)
*G06N 3/04* (2006.01)
*G06V 10/25* (2022.01)

(52) U.S. Cl.
CPC ......... *G06K 9/6264* (2013.01); *G06K 9/6256* (2013.01); *G06K 9/6267* (2013.01); *G06N 3/04* (2013.01); *G06V 10/25* (2022.01)

(58) Field of Classification Search
None
See application file for complete search history.

(56) References Cited

U.S. PATENT DOCUMENTS

| 6,697,998 B1 | 2/2004 | Damerau et al. |
| 10,606,982 B2 * | 3/2020 | Guo ...................... G06F 40/169 |
| 2020/0320709 A1 * | 10/2020 | Geipel ................. G06K 9/6256 |

OTHER PUBLICATIONS

Hedderich, M., et al., "Training a Neural Network in a Low-Resource Setting on Automatically Annotated Noisy Data", Proceedings of the Workshop on Deep Learning Approaches for Low-Resource NLP, Jul. 19, 2018, pp. 12-18.

Mei, Q., et al., "Automatic Labeling of Multinomial Topic Models", KDD'07, Aug. 12-15, 2007, pp. 10 pages.

* cited by examiner

*Primary Examiner* — Leon Flores
(74) *Attorney, Agent, or Firm* — Finnegan, Henderson, Farabow, Garrett & Dunner, LLP

(57) ABSTRACT

This disclosure relates to method and system for of dynamically annotating data or validating annotated data. The method may include receiving input data comprising a plurality of input data points. The method may further include one of: a) generating a plurality of annotations for each of the plurality of input data points using at least one of a state-label mapping model and a comparative ANN model, or b) receiving the plurality of annotations for each of the plurality of input data points from an external device or from a user, and validating the plurality of annotations using at least one of the state-label mapping model and the comparative artificial neural network (ANN) model.

20 Claims, 7 Drawing Sheets

METHOD AND SYSTEM FOR DYNAMICALLY ANNOTATING AND VALIDATING ANNOTATED DATA

TECHNICAL FIELD

This disclosure relates generally to an artificial intelligence (AI), and more particularly to a method and a system for dynamically annotating data or validating annotated data.

BACKGROUND

In the field of Artificial Intelligence (AI) and specifically in the domain of image recognition and identification, there may be a need for availability of quality labelled image datasets to train a supervised Machine Learning (ML) model or a Deep Learning (DL) model. The accuracy and performance of trained ML model or DL model may directly depend on the quality of annotations in the dataset. Thus, it may become important to have a quality labelled dataset for optimal performance. Currently, with the increased focus on DL mechanisms, the requirement for labelled data has increased multifold (i.e., it is very common to see labelled datasets with samples in the order of 1 Million).

The conventional mechanisms for generating labelled dataset (i.e., dataset for supervised ML/DL) includes receiving the data followed by annotating the data. In the conventional methods, the process of annotation may be a manual task performed by a user thus, leading to increased time consumption for manually annotating the data, error prone process, and requiring huge effort. Being a manual error prone process, it becomes a necessity to validate and correct annotations to obtain a quality dataset. Further, verifying the huge labelled datasets is again a manual and time consuming process.

SUMMARY

In one embodiment, a method for dynamically annotating data or validating annotated data is disclosed. In one example, the method may include receiving input data comprising a plurality of input data points. The method may further include one of: a) generating a plurality of annotations for each of the plurality of input data points using at least one of a state-label mapping model and a comparative ANN model, or b) receiving the plurality of annotations for each of the plurality of input data points from an external device or from a user, and validating the plurality of annotations using at least one of the state-label mapping model and the comparative artificial neural network (ANN) model. The state-label mapping model and the comparative ANN model is generated based on verified annotated training data.

In one embodiment, a system for dynamically annotating data or validating annotated data is disclosed. In one example, the system may include an annotation and validation device, which may include at least one processor and a memory communicatively coupled to the at least one processor. The memory may store processor-executable instructions, which, on execution, may cause the processor to receive input data comprising a plurality of input data points. The processor-executable instructions, on execution, may further cause the processor to one of: a) generate a plurality of annotations for each of the plurality of input data points using at least one of a state-label mapping model and a comparative ANN model, or b) receive the plurality of annotations for each of the plurality of input data points from an external device or from a user, and validate the plurality of annotations using at least one of the state-label mapping model and the comparative artificial neural network (ANN) model. The state-label mapping model and the comparative ANN model is generated based on verified annotated training data.

In one embodiment, a non-transitory computer-readable medium storing computer-executable instructions for dynamically annotating data or validating annotated data is disclosed. In one example, the stored instructions, when executed by a processor, may cause the processor to perform operations including receiving input data comprising a plurality of input data points. The operations may further include one of: a) generating a plurality of annotations for each of the plurality of input data points using at least one of a state-label mapping model and a comparative ANN model, or b) receiving the plurality of annotations for each of the plurality of input data points from an external device or from a user, and validating the plurality of annotations using at least one of the state-label mapping model and the comparative artificial neural network (ANN) model. The state-label mapping model and the comparative ANN model is generated based on verified annotated training data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
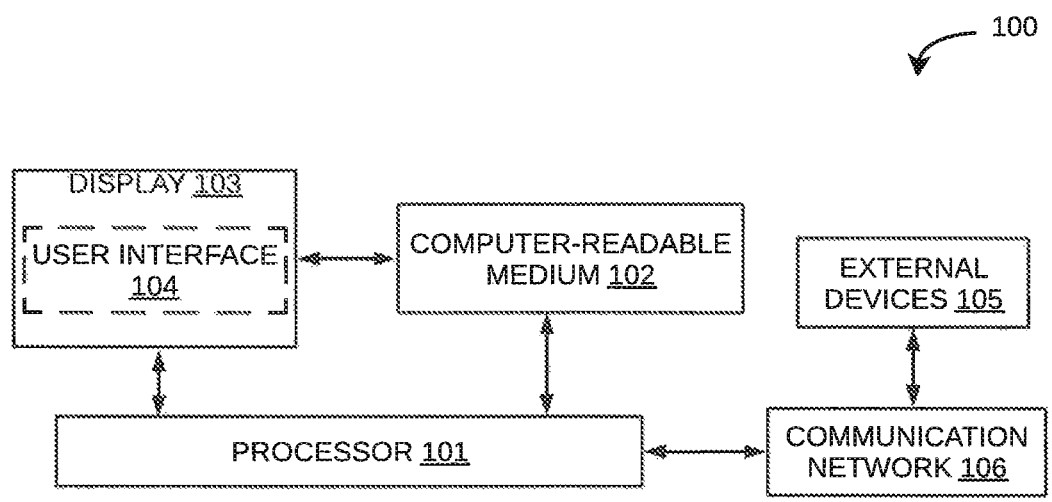
FIG. 1 is a block diagram of an exemplary system for dynamically annotating data or validating annotated data, in accordance with some embodiments of the present disclosure.

Referring now to FIG. 1, a block diagram of an exemplary system 100 for dynamically annotating data or validating annotated data is illustrated, in accordance with some embodiments of the present disclosure. The system 100 may implement in an annotation validating engine, in accordance with some embodiments of the present disclosure. The annotation validating engine may validate an annotated data using a state-label mapping model or a comparative Artificial Neural Network (ANN) model. In particular, the system 100 may include an annotation and validation device (for example, server, desktop, laptop, notebook, netbook, tablet, smartphone, mobile phone, or any other computing device) that may implement the annotation validating engine.

As will be described in greater detail in conjunction with FIGS. 2-7, the annotation validating engine may receive input data comprising a plurality of input data points. In some embodiments, the annotation validating engine may further generate a plurality of annotations for each of the plurality of input data points using at least one of a state-label mapping model and a comparative ANN model. It should be noted that the state-label mapping model and the comparative ANN model may be generated based on verified annotated training data. In alternative embodiments, the annotation validating engine may further receive the plurality of annotations for each of the plurality of input data points from an external device or from a user, and then validate the plurality of annotations using at least one of the state-label mapping model and the comparative artificial neural network (ANN) model. It should be noted that the comparative ANN model may be a Siamese CNN model.

The system 100 may include one or more processors 101, a computer-readable medium (for example, a memory) 102, and a display 103. The computer-readable storage medium 102 may store instructions that, when executed by the one or more processors 101, cause the one or more processors 101 to validate the annotated data, in accordance with aspects of the present disclosure. The computer-readable storage medium 102 may also store various data (for example, input data, a plurality of annotations, state-label mapping model, comparative ANN model, a plurality of suggested annotations, verified annotated training data, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
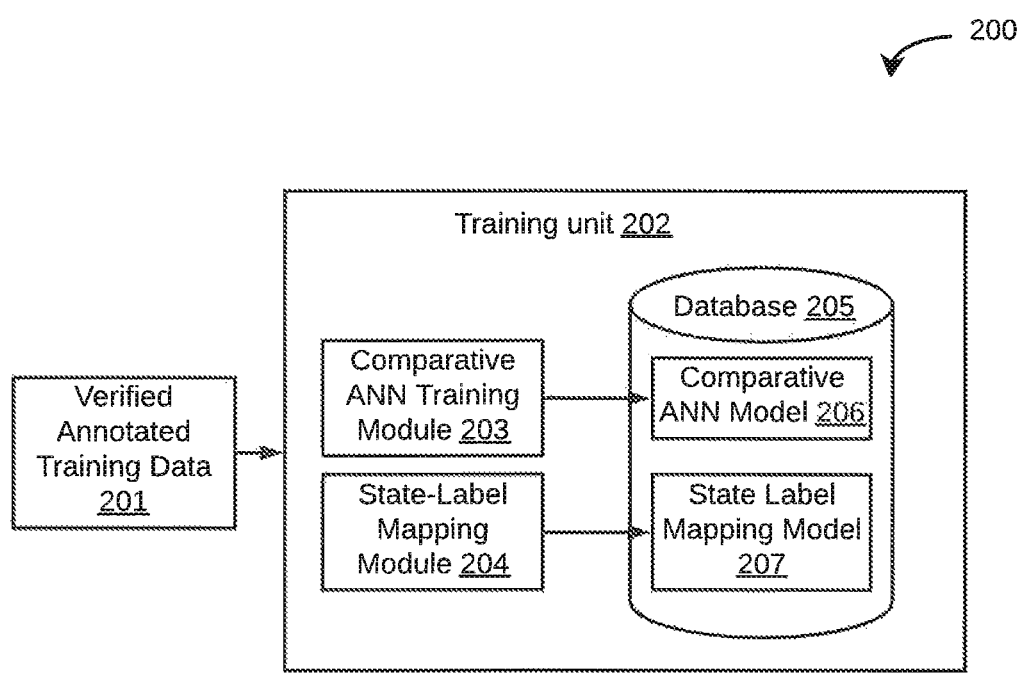
FIG. 2 is a block diagram for generating a comparative artificial neural network (ANN) model and a state-label mapping model, in accordance with some embodiments of the present disclosure.

Referring now to FIG. 2, a block diagram 200 for generating a comparative ANN model 206 and a state-label mapping model 207 implemented by the system 100 of FIG. 1, is illustrated, in accordance with some embodiments of the present disclosure. The block diagram 200 may include a comparative ANN training module 203 and a state-label mapping module 204, which may receive a verified annotated training data 201 and generate the comparative ANN model 206 and the state-label mapping model 207. As will be appreciated, the comparative ANN model 206 may be a Siamese CNN model. Further, the block diagram 200 may store the comparative ANN model 206 and the state-label mapping model 207 in a database 205. As will be appreciated by those skilled in the art, all such aforementioned modules 203-204 may be included in a training unit 202 and may be represented as a single module or a combination of different modules. Moreover, as will be appreciated by those skilled in the art, each of the modules 203-204 and the database 205 may reside, in whole or in parts, on one device or multiple devices in communication with each other.

The verified annotated training data 201 may include a plurality of images which may be manually labelled and validated by a user. The plurality of images may be collected from various sources which may include, but may not be limited to images, videos, captured using digital devices, downloaded from Internet, television contents, or the like. The user may annotate and verify the plurality of images while training the comparative ANN model 206 and the state-label mapping model 207. As will be appreciated, once the comparative ANN model 206 and the state-label mapping model 207 may be trained then the system 100 may automatically annotate and verify the plurality of images. It should be noted that the sample of the plurality of images may be selected in such a way that the plurality of images may include an in-cluster variation and an inter-cluster variations, along with various states.

By way of an example, in a scenario, Dog' may be a cluster. In such scenario, the in-cluster variations of dog may include all possible variations of dogs which may include different types, colors, sizes, orientations, or the like. Additionally, the inter-cluster variations of the dogs may include fox, cat, leopard, or the like. Further the in-cluster variations of fox, cat, leopard, or the like may be a part of the verified annotated training data 201.

The comparative ANN training module 203 may receive the verified annotated training data 201 which may be manually labelled by the user. Further, the verified annotated training data 201 may be used to train the comparative ANN model 206 and the state-label mapping model 207. The comparative ANN model 206 may be a Siamese CNN model and the advantage of using the Siamese CNN model may be that the Siamese CNN model may learn from very few samples of the in-cluster variations and the inter-cluster variations. Further, the Siamese CNN model may learn to predict the similarities between the verified annotated training data 201. Further, based on the predicted similarity, the Siamese CNN model may map a region of interests (Rots) of a given image to an N-dimensional feature vector space. Further, the Siamese CNN model may match the RoIs of the given image with N-dimensional vectors of the RoIs of verified annotated training data 201 and evaluates the similarities between them as per the equation given below:

$$S(x(i),x(j))=D(C(i),C(j))  \quad\quad\quad\quad \text{Equation (1)}$$

where "C" may be column vectors in the N-dimensional features space and D may be a distance function which may include Euclidean, Cosine, or the like.

The state-label mapping module 204 may receive the verified annotated training data 201 which may be used to learn the mapping between the states and labels. Further, the state-label mapping module 204 may store the mapping between state and label in the state-label mapping model 207 of the database 205. The mapping of state and label may be further used during validating the annotated labels. It should be noted that the database 205 may include the comparative ANN model 206 and the State-Label mapping model 207.

The Siamese CNN model may be used during validation of annotated labels for identifying wrongly marked annotated labels. The Siamese CNN model may be used to find out the similarities between two given images. Further, the similarity between the images may be used for validating the label and its RoI using the plurality of images of same cluster. The marked RoI with similarity below a predefined matching threshold may be considered as wrong RoI and may be flagged for manual validation. Moreover, the Siamese CNN model may be used for validating varying in-cluster RoIs and for the RoI suggestions. Additionally, the Siamese CNN model may help in suggesting the RoI for the set of clusters which may become helpful in case of similar looking clusters.

The state-label mapping model 207 may be used for identifying the missing labels during validating the annotated labels. The state-label mapping model 207 may use correlation between the labels and a base state for identifying the missing labels. The correlation between state and labels may include labels always present in the state, labels always occurring together, labels which may not be a part of the state, labels which may never occur together, or the like. Particularly, the base state may be the state of an object in which multiple smaller RoIs may be present and labelled. By way of an example, in an image of a laptop, the base state may be Laptop front open and the labels present may be keyboard, screen, touchpad, power button, or the like.

Figure 3:
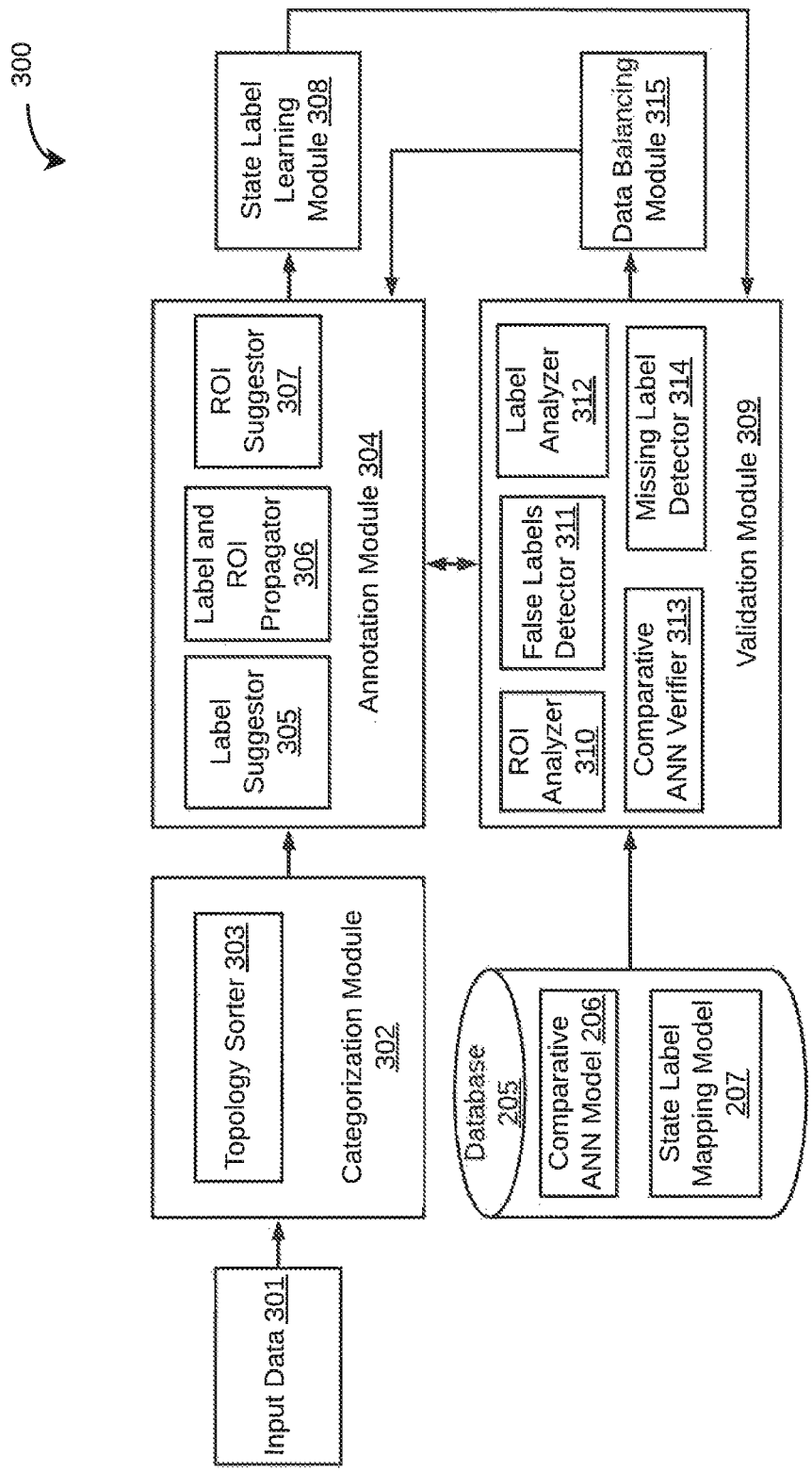
FIG. 3 is a functional block diagram for dynamically annotating data or validating annotated data, in accordance with some embodiments of the present disclosure.

Referring now to FIG. 3, an exemplary block diagram 300 for dynamically annotating data or validating annotated data, implemented by the system 100 of FIG. 1, is illustrated, in accordance with some embodiments of the present disclosure. The exemplary block diagram 300 may include various modules that perform various functions so as to dynamically annotate data or validate annotated data. In some embodiments, the exemplary block diagram 300 may include input data 301, a categorization module 302 which may further include a topology sorter 303, an annotation module 304, a state-label learning module 308, a validation module 309, a data balancing module 315, and a database 205.

The annotation module 304 may further include a label suggestor 305, a label and ROI propagator 306, and a RoI suggestor 307. Moreover, the validation module 309 may further include a RoI analyzer 310, a false label detector 311, a label analyzer 312, a comparative ANN verifier 313, and a missing label detector 314. Additionally, the database 205 may further include a comparative ANN model 206 and a state-label mapping model 207. As will be appreciated by those skilled in the art, all such aforementioned modules 302, 304, 308, 309, and 315 may be represented as a single module or a combination of different modules. Moreover, as will be appreciated by those skilled in the art, each of the modules 302, 304, 308, 309, and 315 and the database 205 may reside, in whole or in parts, on one device or multiple devices in communication with each other.

The input data 301 may be a plurality of images collected from various sources which may include but may not be limited to internet, capture using digital devices, television contents or the like. The input data 301 may be a plurality of images and the metadata information associated with the plurality of images which may include, but may not be limited to size of the dataset, number of samples, timestamps of each image extracted from videos, or the like. As will be appreciated, the input data may also be a textual data which may be received from the various sources.

The categorization module 302 may receive the input data 301 which may be the plurality of images collected from various sources. Moreover, the categorization module 302 may receive the metadata information associated with the plurality of images. Further, the categorization module 302 may categorize the plurality of images into a set of clusters based on a temporal and spatial similarities. It should be noted that the temporal and spatial similarity may be computed based on at least one of frame mapping, background subtraction, distance measure, or the like. Further, the categorization module 302 may send the set of clusters including a categorized plurality of images to the annotation module 304.

The annotation module 304 may be configured to receive the set of clusters along with the categorized plurality of images from the categorization module 302. Moreover, the annotation module 304 may be configured to dynamically recommend a label and a regions of interest (RoIs) to be annotated onto a given images based on at least one of the state-label mapping model 207 or the comparative ANN model 206. The annotation module 304 may receive the state-label mapping model 207 or the comparative ANN model 206 from the database 205. It should be noted that the comparative ANN model 206 may be a Siamese CNN model. As will be appreciated, when the input data may be a textual data then the annotation module 304 may dynamically recommend a knowledge graph of hierarchies of annotated N-grams. Moreover, the topology sorter 303 may be used for propagating annotations in the image sequences. Thus, reducing huge manual efforts and enhancing the quality of the labelled dataset leading to a better accuracy.

Further, the labels and the RoIs may be annotated based on the recommendations provided dynamically by the annotation module 304. The labels and RoIs may be annotated onto the given image by at least one of a user or the annotation module 304 automatically. Moreover, the annotation module 304 may be configured to propagate the annotations of the given image to remaining images available in a cluster of the set of clusters. In an embodiment, the annotation module 304 may include a user interface (UI) to mark, update, delete, or propagate annotations on the plurality of images. Further, the annotation module 304 may be configured to send the annotated labels of each of the plurality of images to each of the validation module 309 and the state-label learning module 308. As will be appreciated, the comparative ANN model 206 and the missing label detector 314 may be used in synchronization with the annotation module 304 to generate an accuracy in the annotated labels.

Additionally, the annotation module 304 may further include the label suggestor 305, the label and ROI propagator 306, and the RoI suggestor 307. The label suggestor 305 and the RoI suggestor 307 may receive the categorized plurality of images from the categorization module 302. Further, the label suggestor 305 and the RoI suggestor 307 may dynamically refine the labels list during annotations. Based on the analysis of RoIs, the RoI suggestor 307 may modify, increase, or decrease the RoI size in various directions resulting in better differentiation between similar looking clusters. By way of an example, for a rectangular RoI, new updated RoI can be made by extending the left, right, top, bottom, or a combination of one or more edges. Further, calculating the similarity score for each update and suggest best possible update for the RoI.

Further, the label and ROI propagator 306 may transfer the annotations from an already available model in public or private domain to each of the plurality of images available in the cluster. The method of propagating the annotated label of the given cluster to each of remaining image of that cluster may use prior knowledge of the trained components which may reduce the repetition in the annotations. The plurality of images categorized in particular cluster may have a high correlation between the adjacent images. Therefore, the annotations may be propagated in all the similar images which is categorized in the cluster, which in-turn results in faster annotation, and lesser manual error of missing annotations.

Further, the state-label learning module 308 may receive the annotated labels of the plurality of images for each set of clusters from the annotation module 304. The state-label learning module 308 may dynamically learn the correlations between the labels and states of each of the plurality of images from the annotated labels. With the knowledge of occurrences of the labels together along with the base states, the state-label learning module 308 may determine which labels cannot be together in the state in the same image. Further, the state-label learning module 308 may send the plurality of images with annotated labels to the validation module 309 for further validation of the annotations applied onto the plurality of images.

The validation module 309 may be communicatively coupled to annotation module 304. The validation module 309 may receive the plurality of images with annotated labels from the annotation module 304. Further, the validation module 309 may analyzes the annotated labels applied to each of the plurality of images using the knowledge learnt by at least one of the state-label learning module 308, State-Label maps, label correlations, or data from the comparative ANN verifier 313. Based on the analysis, the validation module 309 may determine the missed and wrong annotations for a particular state using the data from the state-label mapping model 207 and the comparative ANN model 206. Further, the validation module 309 may send a false annotated images and associated missing annotation labels to the annotation module 304 for correction to be performed by the user or automatically by the annotation module 304. In an embodiment, the validation module 309 may include the label analyzer 312, the missing label detector 314, and the RoI analyzer 310.

The label analyzer 312 may receive the annotated labels from the annotation module 304 and the learnt knowledge from the state-label learning module 308. Further, the label analyzer 312 may use the correlations learnt between the labels and states to flag out the missed and wrong annotated labels. It should be noted that the annotated labels to each of the plurality of images may be performed and analyzed based on at least one of the state-label mapping model 207 and the state-label learning module 308.

The missing label detector 314 may identify the false labels in the state of the plurality of images using the state-label mapping model 207 and the state-label learning module 308. By way of an example, in a scenario where the label analyzer 312 may learn that the probability of component-A and component-B being in the same state may be very high and the annotation module 304 has annotated only one component out of component-A and component-B and missed the other component, the missing label detector 314 may notify the annotation module 304 about the same.

Moreover, the false label detector 311 may identify the errors performed by the annotation module 304 while annotating the plurality of images. By way of an example, in a scenario the annotation module 304 may erroneously apply label-A as label-B or may mistakenly mark the wrong RoI for one or more labels. These kinds of errors while performing annotations in the plurality of images may be identified and highlighted in real-time by the false labels detector 311. Moreover, the false labels detector 311 may compute a similarity measure between the features of the component in domain knowledge and the component features of the marked annotation. Here, the Siamese CNN model may be used for detecting the wrong labels and then used to detect the same in real-time. It can also be used for auto-annotating the data once the system matures and the model accuracy may be near perfect.

Additionally, similar looking clusters may create difficulty for detection and classification systems. In such scenarios, the user may need to analyze and modify the RoIs and the RoI sizes to enhance distances between in-cluster and inter-cluster states and labels. Hence, the RoI analyzer 310 may learn and compare the similarity of features between each cluster of the set of clusters. Moreover, the RoI analyzer 310 may analyze the RoIs, the RoI sizes, and the features similarity of each cluster of the set of clusters. Further, the RoI analyzer 310 may automatically provide suggestion to modify the RoIs and the RoIs sizes of the conflicting clusters to enhance inter-cluster differences. It should be noted that the modifications performed on the label of a cluster may be replicated on each of the plurality of images of that cluster.

The data balancing module 315 may be used to balance the count of the set of clusters and the count of the plurality of images in each cluster to increase accuracy of the specific cluster. Moreover, the data balancing module 315 may suggest a new data source to select images for a cluster with lesser count. Additionally, the data balancing module 315 may be used to auto remove few of the selected images from the plurality of images to balance the count of images when the count of images may be more in the cluster. In an embodiment, the data balancing module 315 may have a user interface (UI) control. Based on the UI control, the user may control the cluster count ratios based on the user requirements or an automated program at regular intervals without any user intervention. Further, the data balancing module 315 may receive the annotated labels of each of the plurality of images and the set of clusters from the validation module 309 to update each cluster and the counts of the set of clusters.

In an embodiment, the data balancing module 315 may use the inputs from the validation module 309 and intimates the user about the same dynamically during the annotation process. The suggestions to include additional data with skewed cluster samples may also be provided to the annotation module 304. The image cluster having very less class may be extracted from the image dataset.

The comparative ANN verifier 313 may map the image features to an N-dimensional Euclidean space, which may exploit the similarity between the annotations to detect wrong annotations and wrong ROIs. In the embodiments where the comparative ANN model 206 is the Siamese CNN model, the comparative ANN verifier 313 may also be referred to as Siamese verifier or Siamese verifying module. Further, the comparative ANN verifier 313 may match similarity between the current labels from past labels of the same cluster to conclude on the quality of the annotations. Further, the comparative ANN verifier 313 may also help the label and RoI suggesting module in recommending the RoIs for the set of clusters.

Further, the comparative ANN verifier 313 (e.g., Siamese verifying module) may use the comparative ANN model 206 (e.g., Siamese CNN model) to flag out the wrong annotations and wrong RoIs in the set of clusters. The validation module 309 may use the comparative ANN verifier 313 and the label analyzer 312 to figure out the wrong annotations, wrong RoIs, varying RoIs and missed annotations. The wrong annotations, wrong RoIs, varying RoIs, and missed annotations may be identified by the comparative ANN verifier 313 when the predicted similarity of a given image with respect to the plurality of images of same cluster may be less than a predefined matching threshold T1. Moreover, the comparative ANN verifier 313 may use the inter-cluster RoIs reference images to figure out the cluster having similarities above a predefined thresholds T2.

Additionally, the Siamese verifying module may use an artificial intelligence based on buffered approach (for example, by increasing size of the RoI or by decreasing size of RoI) to suggest best RoIs for the similar clusters, so that the inter-cluster similarities may get reduced. It may be performed in an iterative approach taking one cluster, at a time, and matching with other cluster references and repeating the same for all other clusters. Further, the Siamese verifying module may figure out the in-cluster RoI variations when the similarity predicted for the cluster with respect to reference images may be less than the predefined threshold.

The database 205 may store the pre-trained Siamese CNN model and the State-label mapping model 207. In an embodiment, the data from the label analyzer 312, the RoI suggestor 307, and the data balancing module 315 may be sent to other users also for validation, tuning of the state-label mapping model 207 and the comparative ANN model 206, and other such purposes.

Figure 4:
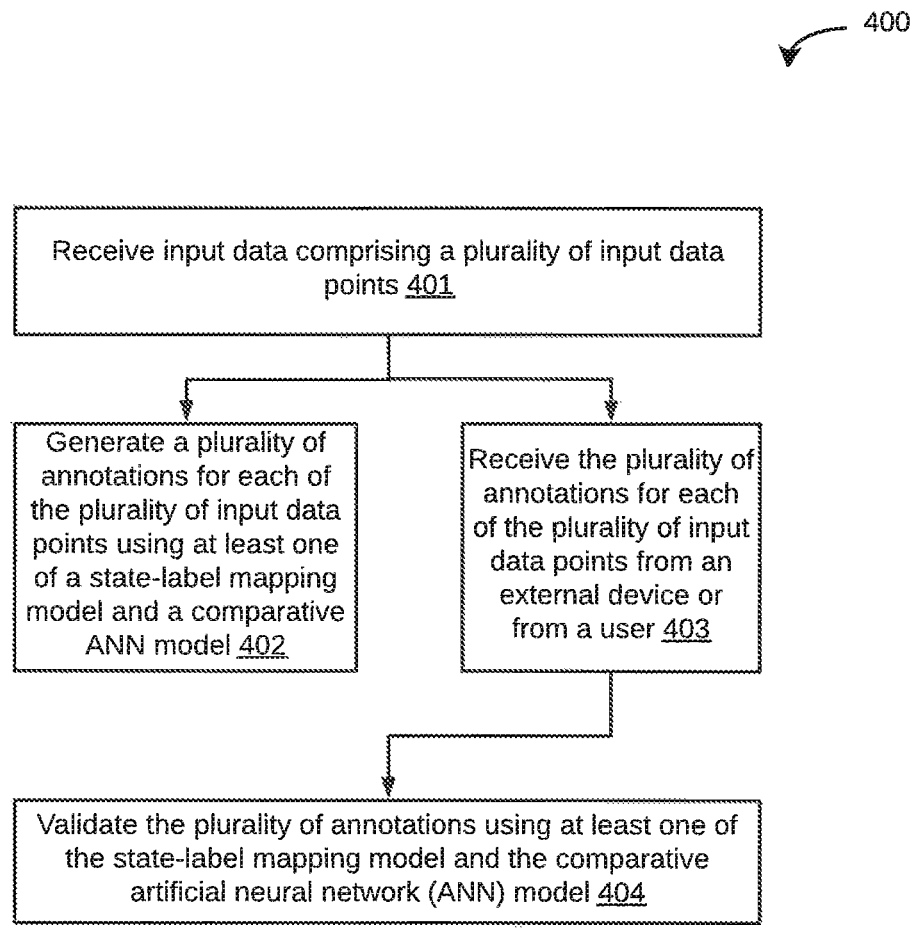
FIG. 4 is a flow diagram of an exemplary process for dynamically annotating data or validating annotated data, in accordance with some embodiments of the present disclosure.

Referring now to FIG. 4, a flow diagram of an exemplary process 400 for dynamically annotating data or validating annotated data is illustrated, in accordance with some embodiments of the present disclosure. As illustrated in the flowchart, the exemplary process 400 may include the step of receiving input data comprising a plurality of input data points at step 401. The exemplary process 400 may further include one of: a) the step of generating a plurality of annotations for each of the plurality of input data points using at least one of a state-label mapping model 207 and a comparative ANN model 206 at step 402, or b) the steps of receiving the plurality of annotations for each of the plurality of input data points from an external device or from a user at step 403, and validating the plurality of annotations using at least one of the state-label mapping model 207 and the comparative ANN model 206 at step 404. As discussed above, the state-label mapping model 207 and the comparative ANN model 206 may be generated based on verified annotated training data.

In some embodiments, receiving the plurality of annotations step 403 may include the steps of generating a plurality of suggested annotations for each of the plurality of input data points using at least one of the state-label mapping model 207 and the comparative ANN model 206 and updating the state-label mapping model 207 based on the plurality of annotations received from the user based on the validation. Additionally, in some embodiments, mapping generating the plurality of annotations at step 402 may include the steps of updating the verified annotated training data 201 based on the plurality of annotations for each of the plurality of input data points based on the validation and generating at least one of the state-label mapping model 207 and the comparative ANN model 206 based on the verified annotated training data 201.

Moreover, generating the plurality of annotations at step 402 may include the steps of categorizing the plurality of input data points into a set of clusters based on at least one of temporal similarity and spatial similarity and propagating the plurality of annotations for each data point in a cluster to remaining data points in the cluster. It should be noted that the state-label mapping model 207 may be a knowledge graph of hierarchies of annotations and the comparative ANN model 206 may be a Siamese convolutional neural network model. As will be appreciated, when input data 301 may be a textual data then the state-label mapping model 207 may be a knowledge graph of hierarchies of annotated N-grams and when input data 301 may be an image data then the state-label mapping model 207 may be a knowledge graph of hierarchies of annotated regions of interest (RoIs). It should be noted that the comparative ANN model 206 may be trained for comparing annotations of RoIs in the verified annotated training data 201 with RoIs in the input data 301 or with annotations of RoIs in the input data 301.

Further, in some embodiments, validating the plurality of annotations at step 404 may include the steps of determining one or more missing annotations from among the plurality of annotations using the state-label mapping model 207 and identifying one or more false annotations from among the plurality of annotations using the comparative ANN model 206.

Figure 5:
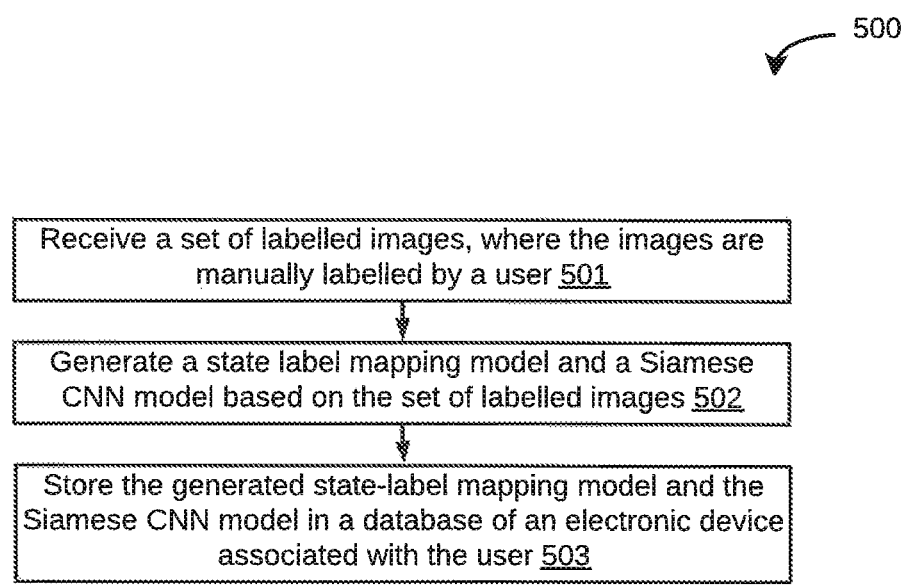
FIG. 5 is a flow diagram of an exemplary process for generating a comparative ANN model and a state-label mapping model, in accordance with some embodiments of the present disclosure.

Referring now to FIG. 5, a flow diagram of an exemplary process 500 for generating a comparative ANN model 206 and a state-label mapping model 207 is illustrated, in accordance with some embodiments of the present disclosure. The control logic 500 may receive a plurality of images which may be annotated manually by a user at step 501. The plurality of images may be collected from various sources which may include, but may not be limited to downloaded content from Internet, content captured using digital devices, television contents, or the like. Moreover, a metadata information associated with the plurality of images may also be extracted from a videos. It should be noted that the metadata information may include, but may not be limited to size of the dataset, number of samples, timestamps, or the like.

Further, based on the plurality of images which may be labelled by the user and the metadata information associated with the plurality of images, the control logic 500 may generate a state-label mapping model 207 and a Siamese CNN model based on annotated labels of the plurality of images at step 502. The state-label-mapping model 207 and the Siamese CNN model may be generated using a small number of a verified annotated training data 201 out of a huge number of the plurality of images. It should be noted that the small number of the verified annotated training data 201 may be sampled from the plurality of images received from various sources at step 501. Moreover, the small number of the verified annotated training data 201 may be annotated and validated manually for creating the training set for the Siamese CNN model making sure that it may include all possible in-cluster variations.

Further, the control logic 500 may extract a label template from the annotated labels and may generate a pair of positive and a pair of negative. It should be noted that the pair of positive may be same labels and the pair of negatives may be different labels. Further, training of the Siamese CNN model may be performed based on the verified annotated training data 201 which may also acts as an initial knowledge base for generating the state-label mapping model 207. The state-label mapping model 207 may be generated to extract a correlation between the labels and states. Further, the control logic 500 may store the state-label mapping model 207 and the Siamese CNN model in the database 205 at step 503.

Figure 6:
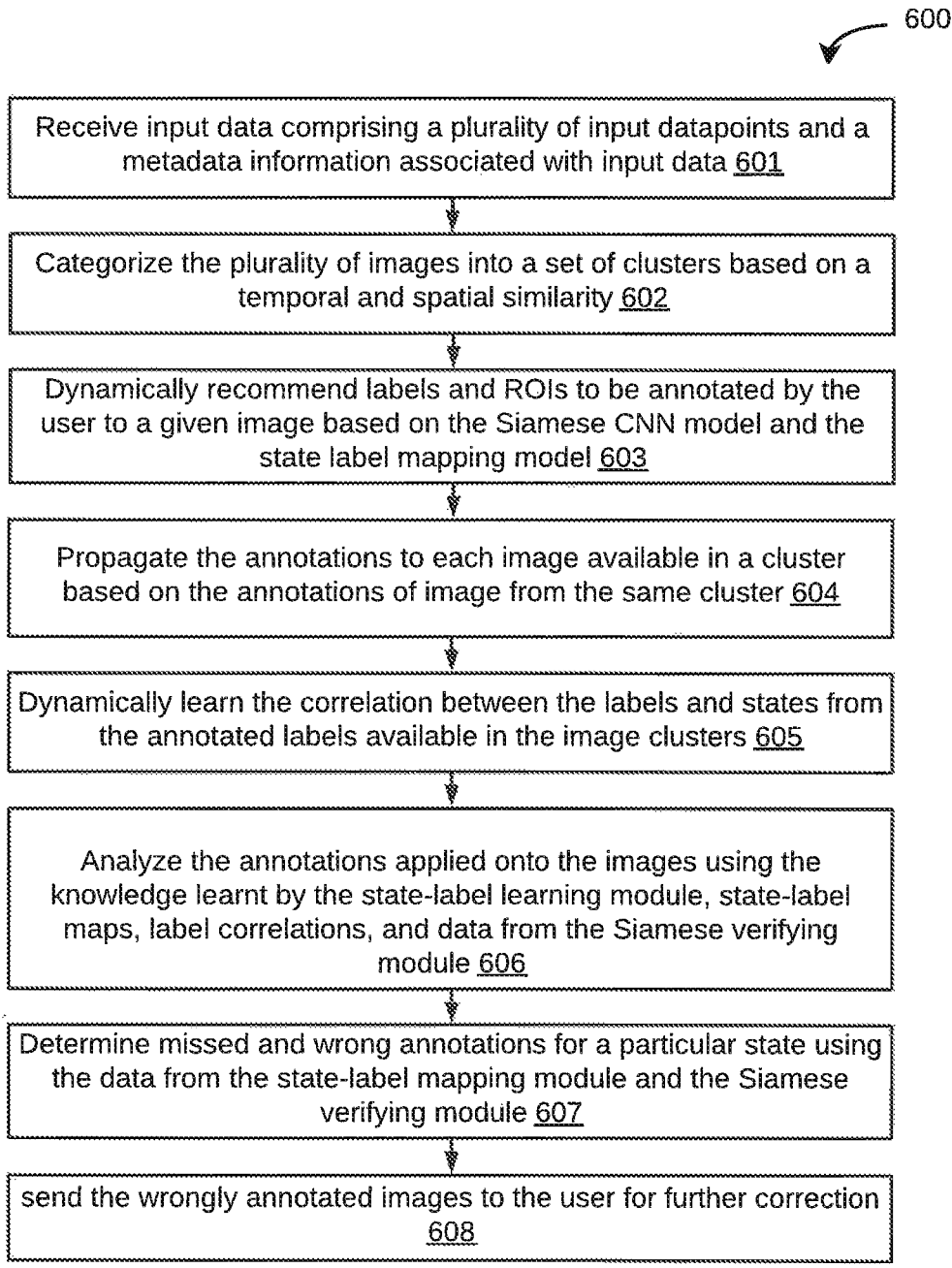
FIG. 6 is a flow diagram of a detailed exemplary process for dynamically annotating data or validating annotated data, in accordance with some embodiments of the present disclosure.

Referring now to FIG. 6, a flow diagram of an exemplary process 600 for dynamically annotating data or validating annotated data is illustrated, in accordance with some embodiments of the present disclosure.

At step 601, the control logic 600 may receive input data 301 comprising a plurality of input datapoints and a metadata information associated with the input data 301. The input data 301 may be a plurality of images and the metadata information associated with the plurality of images may include, but may not be limited to size of the dataset, number of samples, timestamps of each image extracted from videos, or the like.

Further at step 602, the control logic 600 may categorize the plurality of images into a set of clusters based on a temporal and spatial similarity. It should be noted that the temporal and the spatial similarity may be computed based on a frame mapping, background subtraction, distance measure, or the like. By way of an example, the plurality of images may be a sequence of frames associated with a video. Hence, the video across the dataset may be aligned based on temporal frame sequences and the sequence of frames may be sorted and categorized into the same set of cluster. The categorization may be performed based on spatial similarity using image matching and associated distance measures.

In the plurality of images, spatial similarity with various clusters may be used to sort and categorize the plurality of images into a cluster of the set of clusters. Moreover, image matching may be performed at a pixel level using background subtraction mechanisms to categorize the plurality of clusters at a coarse level. Further, image matching and distance measure may be used to categorize the plurality of images at a finer level. Hence, spatial similarities of the plurality of images may be used to sort and categorize the plurality of images into the set of clusters.

In an embodiment, the control logic 600 may use the metadata information of the sequence of images associated with the video from a particular data source, to categorize the plurality of images that may need to be annotated. After completing the categorization of the plurality of images, the similarity measure of the sequence of images may be used to propagate annotated labels to each image of the sequence of images.

At step 603, the control logic 600 may dynamically recommend labels and RoIs to be annotated by the user to a given image based on the Siamese CNN model and the state-label mapping model 207. It should be noted that the RoI may be recommended based on the distance measure. In an embodiment, the user may annotate the RoI associated with the given images from the list of automatically recommended options rendered to the user.

Further, the control logic 600 may propagate the annotations to each images available in a clusters based on the annotations of image from the same cluster at step 604. The control logic 600 may receive the plurality of images available in the set of clusters for labelling and RoI marking. Further, the control logic 600 may use the categorized images to propagate the labels across the sequence of images. Further, the control logic 600 may propagate the labels and RoIs marked on the given image by the user to the topologically categorized sequence of the upcoming images in the cluster which may reduce manual effort and human error. Whenever there may be a state change, the user adjusts and annotates the images and further the control logic 600 may propagate the annotations on the upcoming sequence on the images.

Moreover, the control logic 600 may filter a relevant labels list dynamically using the state-label mapping model 207, which may suggest the RoIs of a cluster during annotations. The control logic 600 may filter the relevant labels list to provide relevant labels for a state, object, or the like using the state-label mapping model 207 and label correlations during the annotation process. As the user marks the state and the object label, the mapping may help in refining the label list dynamically for which the annotation may be carried out. Further, the control logic 600 may suggest the RoIs for the label associated with the cluster during the annotation process. Moreover, the control logic 600 may flag when suggested RoI for the label may not be coordinated with the RoI marked by the user.

At step 605, the control logic 600 may dynamically learn the correlation between the labels and states from the annotated labels available in the image clusters. The labels which should not be available together in a state in the same image may be learnt based on the knowledge of occurrences of the labels together along with the base states. The correlation and co-occurrence between label-label and state-labels may be learnt from the annotated labels during the annotation process and the state-label knowledge map may be created. In an embodiment, the state-label map comprising correlations between the labels and states may be continuously and dynamically updated based on self-learning while performing annotations. Moreover, the state-label maps may be initialized with the knowledge base created from the small sampled verified annotated training data 201. As the control logic 600 may mark the labels in the new images, the state-label maps and label correlations may be updated dynamically.

At step 606, the control logic 600 may analyze the annotations applied onto the images using the knowledge learnt by the state-label learning module 308, state-label maps, label correlations, and data from the Siamese verifying module. Further, based on the analysis of the annotations, the control logic 600 may flag out the missing annotations, false annotations, and wrong RoIs. It should be noted that the annotations of the labels may be analyzed using the knowledge learnt by the state-label learning module 308 for analyzing RoIs and labels using the pre-trained Siamese network to figure out the missed, wrong annotations, and flagging out in-cluster varying RoIs.

Further, the control logic 600 may analyze in-cluster and inter-cluster RoI similarities for suggestion of the labels and RoIs. Further, the control logic 600 may automatically validate the labels and RoIs of the set of clusters and may flag missing, wrong annotations and RoIs. Moreover, the control logic 600 may predict similarities between the RoI of the cluster and its references used during training to flag out the ones with similarity below a predefined threshold. Further, the control logic 600 may use the state-label maps and label correlations knowledge base to flag out the missing and wrong annotations.

Moreover, the control logic 600 may analyze and update the label and RoI of the cluster. However, when two different labels and RoIs of the cluster may have similarities that can affect the desired learning of the Siamese CNN model then the control logic 600 may flag out the same to the user. Further, the control logic 600 may suggest an appropriate RoI for the cluster using a buffering approach. Additionally, when in-cluster RoIs may have variations estimated using the predicted similarities, then the control logic 600 may intimate the same to the user during annotations. It should be noted that the control logic 600 may even suggest the best RoI for the cluster keeping in mind best in-cluster similarity and inter-cluster dissimilarity.

Further at step 607, the control logic 600 may determine missed and wrong annotations for a particular state using the data from the state-label mapping model 207 and the comparative ANN verifier 313 (e.g., Siamese verifier). Based on the analysis, the control logic 600 may determine the missed and wrong annotations for a particular state using the data from the state-label mapping model 207 and the Siamese verifying module. Further at step 608, the control logic 600 may send the wrongly annotated images to the user for further correction.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
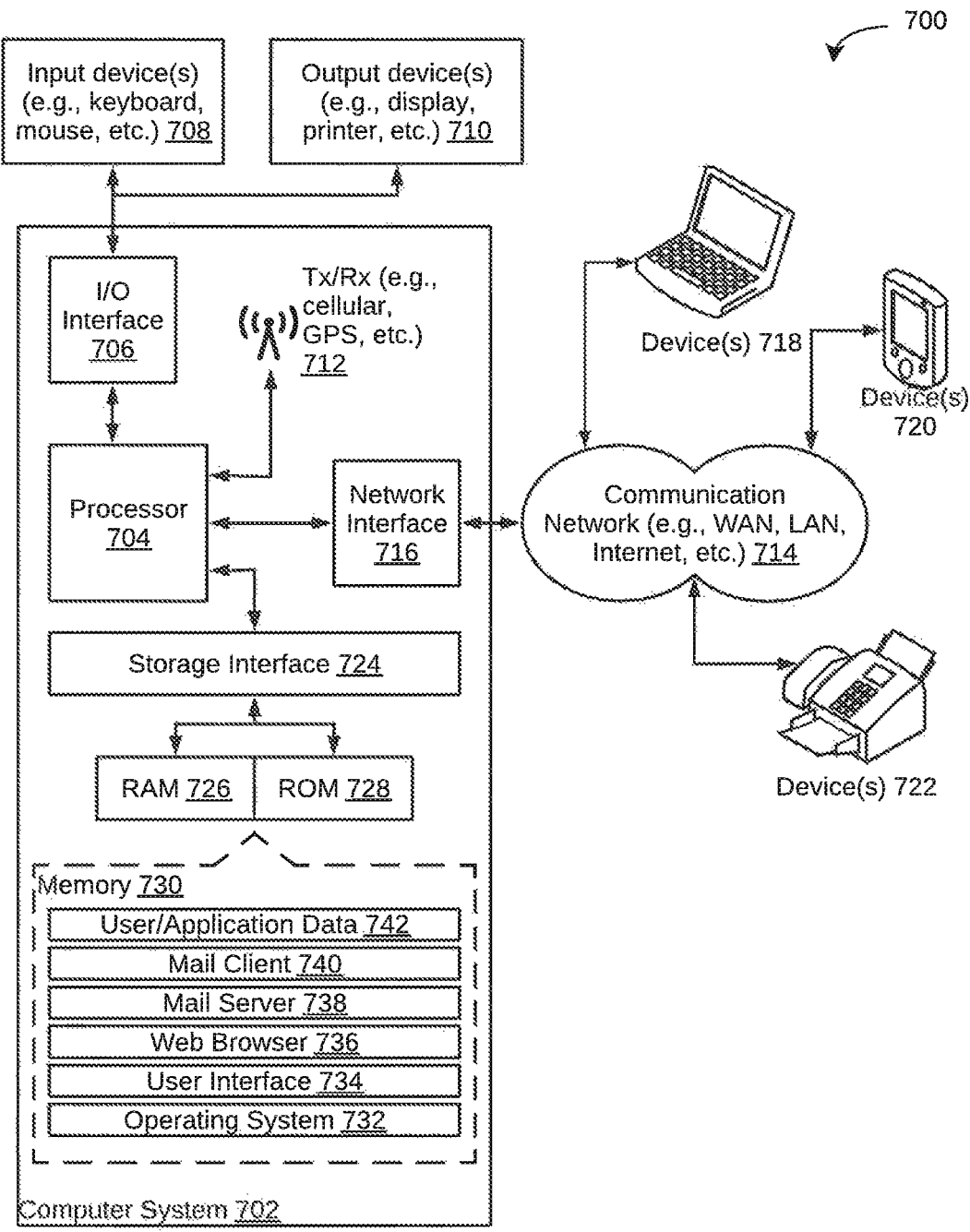
FIG. 7 is a block diagram of an exemplary computer system for implementing embodiments consistent with the present disclosure.

Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dangle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPNHSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices 718, 720, and 722 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices 718, 720, and 722.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces 734 may provide computer interaction interface elements on a display system operatively connected to computer system 702, such as cursors, icons, check boxes, menus, strollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component, Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc, Secure web browsing may be provided using HTTPS (secure hypertext transport protocol), secure sockets layer (SSL), Transport Layer Security (TLS), etc. Web browsers 736 may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provides method and system for dynamically annotating data or validating annotated data. The method may help in generating quality in a labelled image data by automatically validating huge input data for missed labels, wrong labels, wrong RoIs in the labelled image data. Moreover, the method may detect false or wrong annotations, suggest the set of clusters, and identify varying in-cluster RoIs using the Siamese Verifier. Additionally, the proposed method may provide an approach for self-learning state-label maps along with correlation between the set of clusters and the labels while the annotations may be performed, Thus, the approach may help in creating Knowledge base of State-label maps which may be used for identifying missed and wrong labels.

Further, the method may provide an approach for suggesting RoIs for the set of cluster for better inter-cluster differentiations. It may also help in identifying in-cluster RoI variations. Moreover, the method may provide annotation assistance by propagating labels based on topology sorter and aligned image sequences. Additionally, the proposed method may suggest and auto filter labels during annotation which may be of great help in case of huge number of the set of clusters. It also uses the cluster counts for balancing clusters using a data balancer.

The specification has described system and method of dynamically annotating data or validating annotated data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of dynamically annotating data or validating annotated data, the method comprising:
  receiving, by an annotation and validation device, input data comprising a plurality of input data points; and
  one of:
    a) generating, by the annotation and validation device, a plurality of annotations for each of the plurality of input data points using at least one of a state-label mapping model and a comparative artificial neural network (ANN) model, wherein the state-label mapping model and the comparative ANN model is generated based on verified annotated training data; or
    b) receiving, by the annotation and validation device, the plurality of annotations for each of the plurality of input data points from an external device or from a user; and
    validating, by the annotation and validation device, the plurality of annotations using at least one of the state-label mapping model and the comparative artificial neural network (ANN) model;
    categorizing the plurality of input data points into a set of clusters based on a temporal similarity; and
    propagating the plurality of annotations for each data point in a cluster to remaining data points in the cluster.

2. The method of claim 1, wherein receiving the plurality of annotations from the user comprises:
  generating a plurality of suggested annotations for each of the plurality of input data points using at least one of the state-label mapping model and the comparative ANN model.

3. The method of claim 1, further comprising updating the state-label mapping model based on the plurality of annotations received from the user based on the validation.

4. The method of claim 1, further comprising updating the verified annotated training data based on the plurality of annotations for each of the plurality of input data points based on the validation.

5. The method of claim 1, further comprising:
  categorizing the plurality of input data points into a set of clusters based on spatial similarity; and
  propagating the plurality of annotations for each data point in a cluster to remaining data points in the cluster.

6. The method of claim 1, wherein the state-label mapping model is a knowledge graph of hierarchies of annotations, and wherein the comparative ANN model is a Siamese convolutional neural network model.

7. The method of claim 1, further comprising generating at least one of the state-label mapping model and the comparative ANN model based on the verified annotated training data.

8. The method of claim 1, wherein the input data is textual data and wherein the state-label mapping model is a knowledge graph of hierarchies of annotated N-grams.

9. The method of claim 1, wherein the input data is image data and wherein the state-label mapping model is a knowledge graph of hierarchies of annotated regions of interest (RoIs) and wherein the comparative ANN model is trained for comparing annotations of RoIs in the verified annotated training data with RoIs in the input data or with annotations of RoIs in the input data.

10. The method of claim 1, wherein validating the plurality of annotations comprises at least one of:
  determining one or more missing annotations from among the plurality of annotations using the state-label mapping model; and
  identifying one or more false annotations from among the plurality of annotations using the comparative ANN model.

11. A system for dynamically annotating data or validating annotated data, the system comprising:
  an annotation and validation device comprising at least one processor and a computer-readable medium storing instructions that, when executed by the at least one processor, cause the at least one processor to perform operations comprising:
    receiving input data comprising a plurality of input data points;
    and
    one of:
      a) generating a plurality of annotations for each of the plurality of input data points using at least one of a state-label mapping model and a comparative artificial neural network (ANN) model, wherein the state-label mapping model and the comparative ANN model is generated based on verified annotated training data; or
      b) receiving the plurality of annotations for each of the plurality of input data points from an external device or from a user; and
      validating the plurality of annotations using at least one of the state-label mapping model and the comparative artificial neural network (ANN) model;
      categorizing the plurality of input data points into a set of clusters based on a temporal similarity; and
      propagating the plurality of annotations for each data point in a cluster to remaining data points in the cluster.

12. The system of claim 11, wherein receiving the plurality of annotations from the user comprises:
  generating a plurality of suggested annotations for each of the plurality of input data points using at least one of the state-label mapping model and the comparative ANN model.

13. The system of claim 11, further comprising updating the state-label mapping model based on the plurality of annotations received from the user based on the validation.

14. The system of claim 11, further comprising updating the verified annotated training data based on the plurality of annotations for each of the plurality of input data points based on the validation.

15. The system of claim 11, further comprising:
  categorizing the plurality of input data points into a set of clusters based on spatial similarity; and
  propagating the plurality of annotations for each data point in a cluster to remaining data points in the cluster.

16. The system of claim 11, further comprising generating at least one of the state-label mapping model and the comparative ANN model based on the verified annotated training data.

17. The system of claim 11, wherein the input data is textual data and wherein the state-label mapping model is a knowledge graph of hierarchies of annotated N-grams.

18. The system of claim 11, wherein the input data is image data and wherein the state-label mapping model is a knowledge graph of hierarchies of annotated regions of interest (RoIs) and wherein the comparative ANN model is trained for comparing annotations of RoIs in the verified annotated training data with RoIs in the input data or with annotations of RoIs in the input data.

19. The system of claim 11, wherein validating the plurality of annotations comprises at least one of:
   determining one or more missing annotations from among the plurality of annotations using the state-label mapping model; and
   identifying one or more false annotations from among the plurality of annotations using the comparative ANN model.

20. A non-transitory computer-readable medium storing computer-executable instructions for dynamically annotating data or validating annotated data, the non-transitory computer-readable medium configured for:
   receiving input data comprising a plurality of input data points; and
   one of:
      a) generating a plurality of annotations for each of the plurality of input data points using at least one of a state-label mapping model and a comparative neural network (ANN) model, wherein the state-label mapping model and the comparative ANN model is generated based on verified annotated training data; or
      b) receiving the plurality of annotations for each of the plurality of input data points from an external device or from a user; and
      validating the plurality of annotations using at least one of the state-label mapping model and the comparative artificial neural network (ANN) model;
   categorizing the plurality of input data points into a set of clusters based on a temporal similarity;
   propagating the plurality of annotations for each data point in a cluster to remaining data points in the cluster.

* * * * *